United States Patent [19]
Dukert et al.

[11] 3,993,827
[45] Nov. 23, 1976

[54] PLASTIC LAMINATE CONSTRUCTION

[75] Inventors: Andrew A. Dukert, Ambler; Alkis Christofas, Levittown, both of Pa.

[73] Assignee: Pennwalt Corporation, Philadelphia, Pa.

[22] Filed: Aug. 29, 1975

[21] Appl. No.: 609,123

Related U.S. Application Data

[63] Continuation-in-part of Ser. No. 348,577, April 6, 1973, abandoned, which is a continuation-in-part of Ser. No. 154,591, June 18, 1971, Pat. No. 3,779,854.

[52] U.S. Cl. .......................... 428/251; 156/306 A; 156/313 A; 427/385 A; 427/390 A; 427/394; 428/256; 428/268; 428/408; 428/421; 428/422; 427/385 R

[51] Int. Cl.² .................. B32B 27/06; B32B 27/30

[58] Field of Search .......... 428/251, 268, 421, 422, 428/256, 408; 156/306, 313; 427/385, 390, 394

[56] References Cited
UNITED STATES PATENTS
3,458,391   7/1969   Miller ................................ 428/422

Primary Examiner—Marion E. McCamish

[57] ABSTRACT

A ply formed of an outer layer of tetrafluoroethylene polymer impregnating the top surface of a flexible porous matrix and a vinylidene fluoride polymer impregnating the lower surface of said matrix, the vinylidene fluoride polymer surface of the ply being firmly adhered to a substrate of a vinylidene fluoride polymer, preferably reinforced with an embedded flexible porous matrix, to form a reinforced laminate construction.

17 Claims, 2 Drawing Figures

PLASTIC LAMINATE CONSTRUCTION

This application is a continuation-in-part of copending application Ser. No. 348,577 filed Apr. 6, 1973, now abandoned which application is a continuation in part of application Ser. No. 154,591, filed June 18, 1971, now U.S. Pat. No. 3,779,854.

In U.S. Pat. No. 3,779,854, a reinforced laminate construction is disclosed embodying a sheet-like flexible, porous matrix whose interstices are impregnated with vinylidene fluoride polymer resin applied from a liquid carrier comprising a latent solvent for said polymer. The vinylidene fluoride polymer resin impregnated matrix is then firmly adhered to a substrate.

Although these reinforced vinylidene fluoride polymer laminates have proven invaluable in the construction of vessels for storage or conveyance of chemicals and in structures for which the chemical resistance, weatherability and high melting point of vinylidene fluoride polymer resins provide an adequate barrier for chemical attack, there are a great many cases in which it is desired to store or convey chemical materials whose solvent properties or corrosive action exceeds the chemical resistance of vinylidene fluoride polymer, or where the environmental or surface temperature conditions, including factors of thermal recycling, approach or exceed the melting point of the vinylidene fluoride polymer. In any of these latter instances, it would be desirable if at least the surface of the construction exposed to the aggressive chemical or thermal environment were protected with an outer layer of material offering chemical and temperature resistance superior to that of a vinylidene fluoride polymer.

For example, tetrafluoroethylene homopolymer and copolymers or terpolymers of at least 60 mol % thereof with ethylene, vinylidene fluoride or hexafluoropropene all possess superior chemical resistance properties to vinylidene fluoride polymer. While tetrafluoroethylene polymer impregnated matrices and laminates of tetrafluoroethylene polymer impregnated matrices are well known in the art for use as liners for vessels and in non-stick conveyor belts, heretofore these materials could not be successfully laminated to other impregnated laminate substrates, in particular vinylidene fluoride polymer laminates. That is, tetrafluoroethylene polymer laminates cannot be welded by any presently known techniques in the art. They cannot be joined by cementing because there are no known solvents for these resins, and they can be joined to themselves or other surfaces only if the latter surfaces are modified by controlled exposure to special compounds, i.e., sodium napthanate and special adhesives. However, even in the cases where the surface to which the tetrafluoroethylene polymer layer is to be attached has undergone modification, the adhesion is relatively poor and cannot withstand stresses at the interface incurred by the difference in coefficient of expansion between the matrix impregnated liner and the different substrate material to which it is applied.

Furthermore, while tetrafluoroethylene polymer has a relatively high melting point, it is characterized by deformation under load at relatively low temperature. In addition, the non-stick properties of such polymers prevent intimate bonding with matrix-reinforced polyester resins or matrix-reinforced epoxy resins.

It is therefore an object of this invention to provide a method for securely anchoring a layer of tetrafluoroethylene polymer to an underlying vinylidene fluoride polymer layer.

Another object of this invention is to provide a reinforced laminate construction in which an outer ply of tetrafluoroethylene polymer is securely affixed to an underlying vinylidene fluoride polymer impregnated matrix for use as an unsupported structure or for attachment to a substrate.

Still another object of this invention is to provide an improved laminate structure which combines weather and temperature resistance with superior chemical resistance and which will stand up under extreme conditions of thermal cycling.

Other objects of this invention are to provide an improved method and structure of the character described which is easily and economically produced, sturdy in construction, and highly efficient and effective in operation.

With the above and related objects in view, this invention consists of the details of construction and combination of parts as will be more fully understood from the following detailed description, when read in conjunction with the accompanying drawing in which.

Figure 1:
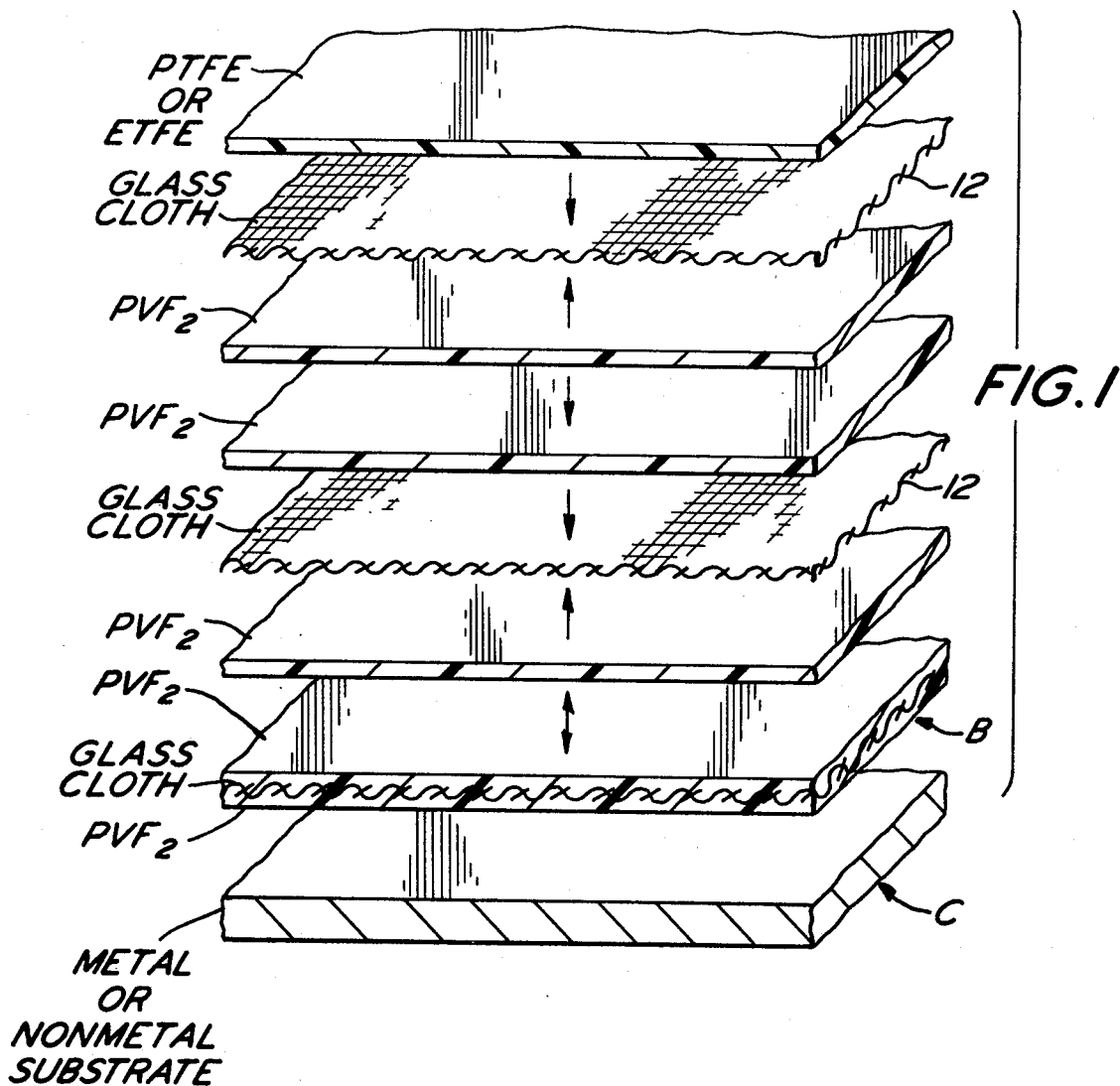
FIG. 1 is an exploded view of the laminate construction embodying this invention.

As seen in FIG. 1 of the drawing, the laminate construction of this invention incorporates an outer ply comprising tetrafluoroethylene polymer resin partially impregnating the outer surface of a flexible, porous, sheet-like matrix 12 such that the interstices or pores are filled to a depth of about one-half the thickness of the matrix and vinylidene fluoride polymer resin partially impregnating the other side of the matrix such that the interstices or pores are filled to a depth defining at least a partial interface with said tetrafluoroethylene polymer, the vinylidene fluoride polymer resin surface of the outer ply being firmly joined to the surface of an underlying of substrate of vinylidene fluoride polymer resin.

In the method of this invention, the outer ply is formed by making one or more applications of the tetrafluoroethylene polymer resin in a liquid carrier to the outer surface of the matrix. The liquid carrier is removed and the reverse side of the matrix is impregnated with vinylidene fluoride polymer resin in a liquid carrier comprising a latent solvent for said vinylidene fluoride polymer. The vinylidene fluoride polymer surface of this ply is firmly adhered to another surface of vinylidene fluoride polymer. This underlying surface may be a sheet of matrix reinforced resin or a sheet of non-reinforced resin. The laminate may be used without further reinforcement or it may be laminated to other similar or different substrates.

Figure 2:
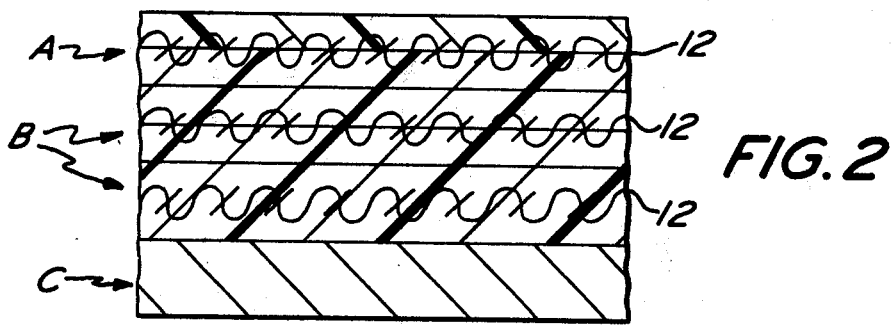
FIG. 2 is a sectional view taken through our composite laminate construction.

Referring now to FIG. 2 of the drawing, a reinforced laminate construction comprising an outer ply of tetrafluoroethylene polymer resin impregnating one side and vinylidene fluoride polymer resin impregnating the other side of a sheet-like matrix 12, is generally designated as A. One or more underlying plies of vinylidene fluoride polymer resin which may or may not incorporate a reinforcing sheet-like matrix, are generally designated at B. Substrate C which can be any solid material is shown underlying the laminated plies A and B. Substrate C is not essential to the laminate construction of this invention.

The term vinylidene fluoride polymer as used herein, refers not only to a resin of the homopolymer of vinylidene fluoride, but also to vinylidene fluoride copolymers and interpolymers containing at least about 50 mol percent of vinylidene fluoride with a remainder of one or more copolymerizable comonomers. Suitable comonomers include ethylene, hexafluoropropene or the halogenated ethylenes such as sym. - dichlorodifluoroethylene, 1-chloro-1,2,2-trifluoroethylene, tetrafluoroethylene, vinyl fluoride, vinyl chloride, and the like. The vinylidene fluoride coating preparations are dispersions or solutions. Examples of preferred vinylidene fluoride dispersions are set forth in U.S. Pat. No. 3,441,531 in which substantially water-free, powdered vinylidene fluoride is mixed with a latent solvent. The term latent solvent is defined as an organic liquid having a boiling point over 50° C and which has no significant solvent or swelling action on vinylidene fluoride polymer at room temperature, but at an elevated temperature exerts a solvent action sufficient to cause the vinylidene fluoride polymer particles to coalesce. The polymeric dispersion comprises about 100 parts by weight of solid particulate vinylidene fluoride polymer dispersed in from about 80 to about 300 parts by weight of the organic latent solvent and in admixture therewith presently from about 0.01 to 2 parts by weight per 100 parts by weight of a cationic surfactant (salts of quaternary ammonium bases).

The flexible, sheet-like matrix used as a base material for the layers of the laminate can be any porous or absorbtive sheet whose interstices are capable of being impregnated by the tetrafluoroethylene polymer and vinylidene fluoride polymer as these resins are applied from a liquid carrier. Examples of such reinforcing matrices are wire mesh, glass cloth, knitted, braided, woven and non-woven fabrics of natural and synthetic fibers; warps or rovings, slivers, batts and scrim; porous synthetic foams; carbon or carbonized cloth; and the like.

The term tetrafluoroethylene polymer as used herein refers to resins which are not only homopolymers of tetrafluoroethylene, but which also are tetrafluoroethylene copolymers and terpolymers containing at least about 60 mol percent of tetrafluoroethylene with a remainder of one or more of the comonomers including ethylene, hexafluoropropene and vinylidene fluoride.

Tetrafluoroethylene polymers in aqueous dispersions are available commercially in solids concentrations of from about 25 to about 75% by weight and such can be used to prepare the laminate of this invention. However, resin compositions containing amounts of particulate resins in liquid carriers which amounts are in the higher end of the range, e.g., from about 60 to about 70% by weight, are preferred for this invention in order to obtain the desired results with the least number of applications and within the shortest time. Examples of aqueous dispersions and suspensoids of tetrafluoroethylene polymers are found in U.S. Pat. No. 2,731,068 to Richards.

Either or both of the tetrafluoroethylene polymer resin dispersion or vinylidene fluoride polymer resin dispersion can contain pigments and fillers in amounts ranging from 30 to about 125 parts by weight per 100 parts of resin. Pigments such as titanium dioxide, carbon black, graphite, zinc oxide, zinc sulfide, chrome oxide and phthalocyanines, are useful. Fillers, such as mica flakes, metal powders, silica, clay, finely-ground glass, etc., are useful as desired.

Since tetrafluoroethylene polymer resins applied from liquid carriers, e.g., aqueous dispersions, tend to provide a rather porous surface, a substantially non-porous film of tetrafluoroethylene polymer may be deposited and adhered to the outer surface of the tetrafluoroethylene polymer impregnated matrix. The film may be either formed in sit or preformed and then laminated to the matrix reinforced tetrafluoroethylene polymer surface.

The following examples are illustrative of the invention:

EXAMPLE 1

Glass cloth satin weave treated with an acrylic complex finish, known as Volan, was sprayed on one side with a tetrafluoroethylene homopolymer (PTFE) water emulsion containing approximately 50–60% PTFE resin solids. The Volan finish may be removed before spraying with the emulsion, if desired. A Paasche air brush having a No. 1 spray tip with a needle assembly was used with the air pressure adjusted to 25–30 lbs/sq. in. and the air tip positioned at a distance of approximately 10 to 12 inches from the glass cloth. A fine coating was applied thereto on one surface thereof so that maximum penetration did extend beyond substantially one-half the thickness of the yarns forming the cloth wrap and weave. The PTFE coated cloth was then dried at 95° and thereafter heated at 370° C to sinter the tetrafluoroethylene polymer deposited on the yarns.

A second coating of tetrafluoroethylene polymer was applied over the first in the same manner as above until a continuous PTFE film was formed completely sealing the interstices of the glass fabric. The drying and sintering step was then repeated. Approximately two to three repeated applications of the PTFE emulsion were required with an average pick-up of 20–30% PTFE on the weight of the construction.

The glass cloth, coated on one face with tetrafluoroethylene polymer as above, was then pressed in a press heated at 370° C with a polished platen against the PTFE coated surface or pressed between two polished steel rolls heated to 370° C in order to induce flow of the sintered particles of PTFE and secure a non-porous continuous coating. A pressure of 250–300 lbs./sq.in. was applied on the PTFE coated surface heated to 370° C.

The non-coated surface of the glass cloth having PTFE applied on one side was then coated with vinylidene fluoride polymer which was applied from a liquid carrier by spraying, doctor knife application or continuous coating system as shown in our prior U.S. Pat. No. 3,779,854.

The vinylidene fluoride polymer dispersion was of the following composition:

| | Parts by Weight |
|---|---|
| vinylidene fluoride homopolymer (fine powder) | 45.0 |
| Dimethyl Pthalate | 38.5 |
| Di-isobutyl ketone | 16.5 |
| Isophorone | 10.0 |

After the vinylidene fluoride homopolymer dispersion was applied to a thickness of approximately 0.005–0.020 inch thickness, and preferably 0.010–0.012 inch of wet layer of resin dispersion, the coating was fused at 260° C thereby providing a surface on which additional layers of vinylidene fluoride polymer impregnated cloth may be applied by any one of the methods disclosed by our prior U.S. Pat. No. 3,779,854.

The finished laminate provides a sheet which can be cut to the appropriate size, thermoformed and welded or cemented to a surface such as the surface of vessels for storing or conveying chemicals, or used in unsupported configuration for transporting chemicals. The highly resistant tetrafluoroethylene polymer layer affords protection against chemical attack while the underlying vinylidene fluoride polymer laminate provides the structural strength, shape, stability and bondability to underlying substrates while permitting ease of application by way of thermoforming, welding and cementing.

EXAMPLE 2

A thin layer of tetrafluoroethylene homopolymer (PTFE) was roller coated from a water emulsion to one surface of Volan treated glass cloth, satin weave, and fused, all as set forth in the first, second and third paragraphs of Example 1.

The PTFE impregnated surface was then covered with a thin film tetrafluoroethylene-hexafluoropropene copolymer, 0.001 inch thick, on top of which was positioned a skived film of PTFE approximately 0.003 inch in thickness. This construction was then pressed between 370° C platens of a hydraulic press at 250 lbs/sq.in. The resulting construction had one face covered by a strongly adhering PTFE film while the opposite face was clean glass cloth.

A vinylidene fluoride homopolymer dispersion was then applied to the uncoated glass cloth surface in a manner described by Example 1, after which this surface was anchored to another vinylidene fluoride polymer impregnated glass cloth reinforced laminate, as described in the last two paragraphs of Example 1.

The intermediate film of tetrafluoroethylene - hexafluoropropene copolymer permitted the adhesion on that surface of the fabric with minimum tetrafluoroethylene polymer resin coating and limits the permeation in the fibers to the absolute minimum for anchoring the resin outer protective coating.

EXAMPLE 3

Another sheet of the Volan-treated, glass cloth, satin weave was impregnated entirely through the interstices thereof by dipping, spraying or doctor-blade application, with an emulsion of tetrafluoroethylene-ethylene copolymer so that both sides of the glass cloth were coated. This impregnated cloth was heated to 95° C until dry, and the application repeated until a 40–45% copolymer pick-up in total weight was attained.

The impregnated cloth was then heated in an oven to about 290° C until the copolymer deposited in the yarns became fused.

A piece of the copolymer impregnated cloth was then covered with a second sheet of the glass cloth and pressed together at 30 to 50 lbs/sq.in. pressure between press platens or rollers having a temperature of 290° C. The outboard surface of the second sheet of glass cloth secured to the copolymer impregnated fabric was then coated with a vinylidene fluoride homopolymer dispersion in accordance with the third and fourth paragraphs of Example 1.

The construction thus obtained had an outer face protected by the relatively-high chemically resistant tetrafluoroethylene-ethylene copolymer while the opposite surface of the vinylidene fluoride polymer coated glass cloth provides an anchoring base for subsequent application of vinylidene fluoride polymer laminates or laminates of glass cloth impregnated with tetrafluoroethylene-ethylene copolymers.

EXAMPLE 4

Graphite cloth grade WCA, a fibrous graphite in broadgoods form having a square weave construction is sprayed on one side with PTFE water emulsion containing approximately 50–60% solids made up from PTFE resin and graphite powder. A Paasche airbrush having a No. 1 spray tip with a needle assembly was used with the air pressure adjusted to 30–35 pounds per square inch and the air tip positioned at a distance of approximately 10–12 from the graphite cloth. A fine coating was applied on one surface of the cloth so that maximum penetration did not extend beyond substantially ½the thickness of the yarns forming the cloth wrap, warp, and weave. The combination PTFE-carbon cloth was then dried at 95°and thereafter heated to 370° C to sinter the PTFE deposited on the yarns. A second coating of the same PTFE-graphite mixture was applied over the first in the same manner until a continuous PTFE film was formed completely sealing the interstices of the graphite fabric. The drying and sintering step was then repeated. Approximately 2–3 repeated applications of the PTFE-graphite emulsion were required with an average pick-up of 25–30% solids on the weight of the construction. The graphite cloth coated on one face with the PTFE-graphite mixture as above was then pressed in a press, heated at 188° C with a polished platen against the PTFE coated surface or pressed between two poly-steel rolls heated to 188° C in order to induce flow of the sintered particles of the PTFE and secure a non-porous continuous coating. A pressure of 250–300 pounds per square inch was applied on the PTFE-carbon coated surface heated to 188° C.

The non-coated surface of the graphite cloth having the PTFE-carbon applied on one side was then impregnated with vinylidene fluoride homopolymer resin which was applied from a latent solvent by spraying, doctor blade application or continuous coating system as shown in U.S. Pat. No. 3,779,854. The vinylidene fluoride polymer (PVF$_2$) dispersion was of the following composition:

|  | % By Weight |
|---|---|
| Carbitol Acetate | 8.93 |
| Dimethyl Phthalate | 3.09 |
| Isophorone | 37.35 |
| Butyrolactone | 4.38 |
| Catanac SN (cationic surfactant) | .23 |
| KYNAR 301F (vinylidene fluoride homopolymer | 23.02 |
| Micro Graphite 470 (graphite powder) | 23.02 |

After the PVF$_2$ dispersion was applied to a thickness of approximately 0.005–0.020 thickness and preferably 0.010–0.012 of wet layer resin-graphite dispersion, the coating was fused at 260° C. thereby providing a surface on which additional layers of vinylidene fluoride polymer-graphite dispersion impregnated graphite cloth may be applied by any of the methods disclosed by our U.S. Pat. No. 3,779,854.

The finished laminate provides a sheet which can be cut to the appropriate size, thermoformed and welded or cemented to the surface of vessels for storing or conveying chemicals or in unsupported configuration for transporting chemicals or using as a singular structure for the same. The highly resistant PTFE-graphite layer affords the structural strength, shape, stability and bondability to underlying substrates while permitting ease of application by way of thermoforming, welding, and cementing.

EXAMPLE 5

A thin layer of combination PTFE-graphite was roller coated from a water emulsion to one surface of the graphite cloth and fused. The dispersion (emulsion) composition, graphite cloth and fusion step were as set forth in Example 4.

The PTFE-graphite impregnated surface was then covered with a thin film of tetrafluoroethylene-hexafluoropropene (FEP) copolymer 0.001 thick on top of which was positioned a skived film of PTFE approximately 0.003 in thickness. This construction was then pressed between platens on a hydraulic press, heated to 188° C, and at 250 psi. The resulting construction had one face covered by strongly adhering PTFE film in combination with graphite while the opposite face was clean graphite cloth. A $PVF_2$ latent solvent dispersion was then applied to the uncoated graphite cloth surface in the manner described in the Example 4 after the latter $PVF_2$ surface was anchored to another vinylidene fluoride homopolymer impregnated graphite cloth reinforced laminate.

The intermediate film of FEP copolymer permitted the adhesion on that surface of the fabric with minimum PTFE-graphite coating and limits the permeation in the fibers to the absolute minimum for anchoring the PTFE outer protection coating.

EXAMPLE 6

A section of graphite cloth grade WCA was totally impregnated entirely through the interstices thereof by dipping, roller coating, spraying or doctor blade application with an emulsion of tetrafluoroethylene-ethylene copolymer so that both sides of the graphite cloth were coated. This impregnated cloth was heated to 95° C until dry and the application repeated until a 45–50% copolymer pick-up in total weight is attained.

The impregnated cloth was then heated in an oven to about 290° C until the copolymer deposited in the yarn became totally fused.

A section of the tetrafluoroethylene-ethylene copolymer impregnated cloth was then covered with a second sheet of the graphite cloth and pressed together at 30–50 psi between press platens or rollers having a temperature of 290° C. The outboard surface of the second sheet of graphite cloth secured to the copolymer impregnated fabric was then coated with a $PVF_2$ latent solvent dispersion in accordance with the third and fourth paragraph of Example 4.

The construction thus obtained had an outer face protected by the relatively high chemically resistant tetrafluoroethylene copolymer while the opposite surface of the $PVF_2$ coated graphite cloth provides an anchoring base for subsequent application of vinylidene fluoride polymer laminates, laminates of matrices including glass or carbon cloth impregnated with the tetrafluoroethylene copolymers.

What is claimed is:

1. A reinforced laminate construction having an outer ply comprising a flexible, porous, sheet-like matrix having the outer surface impregnated with a tetrafluoroethylene polymer resin applied from a liquid carrier to a depth not exceeding about one-half the thickness of said matrix, the under surface of said matrix being impregnated with a vinylidene fluoride polymer resin applied from a liquid carrier comprising a latent solvent for said resin to a depth defining at least a partial interface with said tetrafluoroethylene polymer resin in said matrix, and an inner ply comprising a sheet of a vinylidene fluoride polymer resin, the surface of said inner ply being in face-to-face adherent disposition with the surface of said vinylidene fluoride polymer resin of said outer ply, said tetrafluoroethylene polymer selected from the group consisting of homopolymer, and copolymers and terpolymers of at least 60 mol percent of tetrafluoroethylene with one or more comonomers selected from the group consisting of ethylene, vinylidene fluoride and hexafluoropropene, said vinylidene fluoride polymers selected from the group consisting of homopolymer and copolymers and terpolymers of at least 50 mol percent vinylidene fluoride with one or more comonomers selected from the group consisting of ethylene, chlorinated ethylenes, fluorinated ethylenes and hexafluoropropene.

2. The reinforced laminate of claim 1 wherein said tetrafluoroethylene polymer is a homopolymer.

3. The reinforced laminate of claim 1 wherein said tetrafluoroethylene polymer is a copolymer.

4. The reinforced laminate of claim 1 wherein said vinylidene fluoride polymer is a homopolymer.

5. The reinforced laminate of claim 1 wherein said vinylidene fluoride polymer is a copolymer.

6. The reinforced laminate of claim 1 wherein said matrix is glass cloth.

7. The reinforced laminate of claim 1 wherein said matrix is carbon cloth.

8. The reinforced laminate of claim 1 wherein the tetrafluoroethylene polymer resin is mixed with graphite powder in an amount ranging from 30 to 125 parts per 100 parts by weight of resin.

9. The reinforced laminate of claim 1 wherein the vinylidene fluoride polymer resin is mixed with graphite powder in an amount ranging from 30 to 125 parts per 100 parts by weight of resin.

10. The reinforced laminate of claim 1 wherein the tetrafluoroethylene polymer resin surface has a coating of a film of a tetrafluoroethylene polymer resin firmly adhering thereto.

11. The reinforced laminate of claim 1 wherein the vinylidene fluoride polymer resin surface of the innerply is attached to a metallic or nonmetallic substrate.

12. A method of fabricating a reinforced laminate construction comprising the steps of:
  a. impregnating one surface of a flexible, porous, sheetlike matrix with a tetrafluoroethylene polymer resin applied from a liquid carrier to a depth not exceeding about one-half the thickness of the matrix, said tetrafluoroethylene polymer selected from the group consisting of homopolymer and copolymer and terpolymer of at least 60 mol percent tetrafluoroethylene with one or more of ethylene, vinylidene fluoride or hexafluoropropene,
  b. sintering the tetrafluoroethylene polymer
  c. impregnating the other surface of said matrix with vinylidene fluoride polymer resin of applied from a liquid carrier comprising a latent solvent for said resin to a depth defining at least a partial interface with said tetrafluoroethylene polymer, said vinylidene fluoride polymer selected from the group consisting of homopolymer, and copolymer and terpolymers of at least 50 mol percent of vinylidene fluoride with one or more of ethylene, chlorinated ethylenes, fluoroinated ethylenes and hexafluoropropene, d. evaporating the solvent from the vinylidene fluoride polymer, e. fusing the vinylidene fluoride polymer, and f. pressing the fused vinylidene fluoride polymer surface into contact with another sheet-like surface of vinylidene fluoride polymer resin.

13. The method of claim 12 wherein between steps (b) and (c) the tetrafluoroethylene polymer impregnated matrix is subjected to sufficient heat and pressure to provide a resin of reduced porosity.

14. The method of claim 12 wherein step (e) is performed at a temperature of about 260° C, 15. The method of claim 12 wherein a film of tetrafluoroethylene polymer resin is applied to the sintered surface of the tetrafluoroethylene polymer impregnated matrix and said film is heat pressed thereon.

16. The method of claim 12 wherein a film of tetrafluoroethylene-hexafluoropropene copolymer resin is applied to the sintered surface of the tetrafluoroethylene polymer impregnated matrix, a film of tetrafluoroethylene homopolymer resin is applied to the top of the copolymer film and the laminate subjected to heat and pressure to obtain firmly adhering layers.

17. The method of claim 12 wherein an additional step (g) comprises securing the exposed sheet-like surface of vinylidene fluoride polymer resin of step (f) to a metallic or non-metallic substrate.

* * * * *